United States Patent [19]

Cruz-Uribe et al.

[11] 4,340,896

[45] Jul. 20, 1982

[54] IMPULSE INK JET INK DELIVERY APPARATUS

[75] Inventors: Antonio S. Cruz-Uribe, Cobalt; Frank T. Check, Jr., Orange, both of Conn.

[73] Assignee: Pitney Bowes Inc., Stamford, Conn.

[21] Appl. No.: 218,897

[22] Filed: Dec. 22, 1980

[51] Int. Cl.[3] .......... G01D 15/18

[52] U.S. Cl. .......... 346/140 R

[58] Field of Search .......... 346/75, 140 R, 140 IJ, 346/140 PD

[56] References Cited

U.S. PATENT DOCUMENTS 4,126,868 11/1978 Kirner .......... 346/140 PD 4,149,172 4/1979 Heinzl et al. .......... 346/140 PD

*Primary Examiner*—Joseph W. Hartary

*Assistant Examiner*—W. J. Brady

*Attorney, Agent, or Firm*—Melvin J. Scolnick; William D. Soltow, Jr.; Albert W. Scribner

[57] ABSTRACT

An apparatus is described for delivering ink to an array of impulse ink jet heads some of which may be at different vertical locations. A flow of ink is established along a supply conduit located vertically below the ink jet heads. Ink feed conduits connect at junctions to the supply conduit to provide the ink jet heads with ink. A plurality of flow impeding devices are employed between the junctions so as to enable the formation of columns of ink in the feed conduits of sufficient height to supply the ink to the impulse ink feed jets. Appropriate spacing of the ink jet heads above the top of the ink columns then provides required small negative ink pressures.

7 Claims, 2 Drawing Figures

RESERVOIR
FILTER
PUMP
$T_R$
$P_{out}$
$P_{in}$
$\Delta P_a$
$\Delta P_b$
$\Delta P_c$
$P_1$
$P_2$
$P_3$
$-P_h$
$-P'_h$
L
d

IMPULSE INK JET INK DELIVERY APPARATUS

FIELD OF THE INVENTION

This invention relates to ink jet printing generally and, more specifically, to ink jet printing devices in which ink is supplied to orifices through capillary action and then ejected to form ink drops.

BACKGROUND OF THE INVENTION

In the field of ink jet printing one type of ink jet head, known as an impulse ink jet, generates drops of ink for printing by supplying ink at a very low pressure (of the order of about minus one inch of water) to capillary tubes. The capillary tubes lead to orifices at the ink head and ink drops are ejected in response to impulses applied to the ink in the capillary tubes. Such impulses typically are produced with piezoelectric devices. A description of an impulse ink jet may, for instance, be found in an article entitled "Silent Ink Jet Printing For Printer Terminals" by J. Heinzl et al and published in Siemens Review 44(9) pages 402–404, Sept. 1977.

When capillary action is relied upon to deliver ink to an orifice of an ink jet head, care must be taken that the ink pressure is neither too high nor too low. If the pressure is too low, the ink withdraws too far from the orifice to produce reliable drops. If the pressure is too high, the orifice tends to bleed ink which interferes with the generation of the proper types of ink drops. Since the desired ink pressure behind the capillary tube is of the order of about one negative inch of water, the operation of the impulse ink jet head is sensitive to its vertical position relative to the supply of ink.

Devices have been proposed whereby the ink supply pressure to an impulse ink jet head is carefully controlled. When a plurality of impulse ink jets, however, are used at different vertical heights, the supply of ink at the desired pressure becomes complicated, particularly when the pressure is to be tightly regulated, e.g. within a fraction of an equivalent inch of water.

In the printing of envelopes and other documents, a need exists to be able to print at different vertical locations. However, the supply of ink to impulse ink jets at such different vertical locations is difficult and elaborate.

SUMMARY OF THE INVENTION

With an apparatus in accordance with the invention, ink can be delivered to impulse ink jet heads at different vertical positions in an accurate and precisely controlled manner. In one form of the invention as described herein, a flow of ink is produced along a conduit which is generally located vertically below an impulse ink jet head to be supplied with ink. The ink jet head is coupled to the conduit at a junction and a fluid flow impedance is located on the downstream side of the junction. The magnitude of the impedance is so selected that a column of liquid is formed in the tube coupling the ink jet head to the flow of ink. The magnitude of the impedance is set so that the ink column is sufficient to deliver ink to the impulse ink jet head.

A plurality of impulse ink jet heads at different vertical positions may thus be supplied with ink with a simple structure. For example, as described herein, a circulating flow of ink from a supply is established along a supply conduit located vertically below the impulse ink jet heads. The latter are coupled to the conduit with separate feed conduits for ink jet heads at different vertical positions. Downstream of each junction of a feed conduit are interposed within the supply conduit is a flow restrictor which is sized to enable formation of a column of ink in the upstream-located feed conduit. The flow restrictors are so formed that each column of ink has a height which is correct for the associated impulse ink jet head. In order to obtain the desired negative pressure, the impulse ink jet head is then simply placed an inch above the top of the ink column.

With an apparatus in accordance with the invention, the delivery of ink to a plurality of impulse ink jet heads at different vertical positions is more conveniently and precisely achieved from a common ink supply without elaborate controls. It is, therefore, an object of the invention to provide an apparatus for delivering ink to an impulse ink jet head in a simple and practical manner. It is a further object of the invention to provide an apparatus for delivering ink from a common supply to a plurality of impulse ink jet heads which may be located at different vertical positions.

These and other advantages and objects of the invention can be understood from the following detailed description of an embodiment described in conjunction with the drawing.

DETAILED DESCRIPTION OF FIGURES

Figures 1, 2:
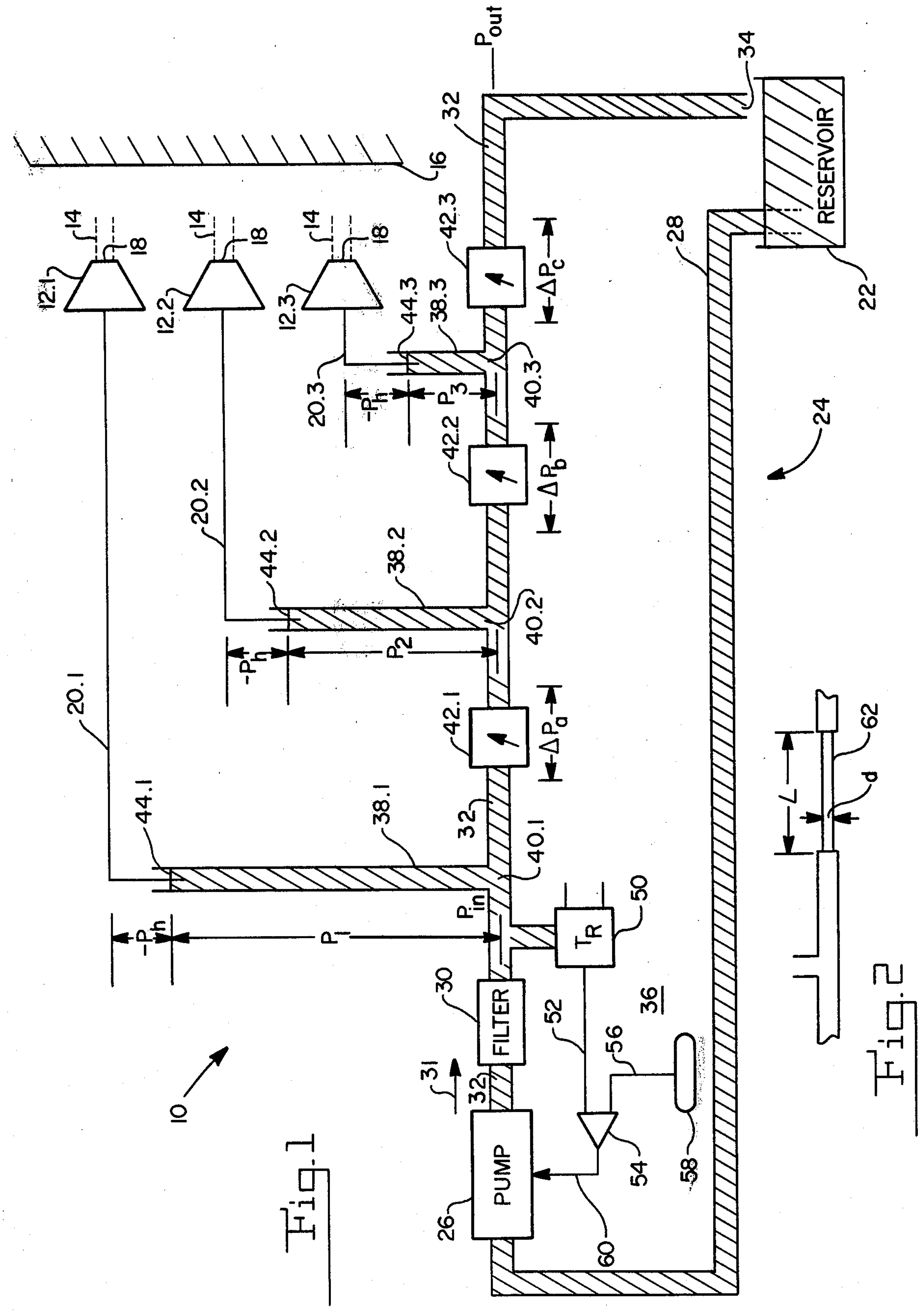
FIG. 1 is a schematic and block diagram view of an apparatus in accordance with the invention.
FIG. 2 is a cross-sectional schematic view of one ink flow restrictor for use in the apparatus of FIG. 1.

In FIG. 1 an apparatus 10 is shown for supplying ink to a plurality of impulse ink jet heads 12 disposed to supply ink drops 14 on a recording medium 16 such as paper. The control and actuation for ink jet heads 12 are well known and, therefore, are not shown. The ink jet heads 12 supply ink to an array of orifices located on front surfaces 18 through capillary channels.

As is well known in the art, the ejection of ink drops may be with piezoelectric transducers located in heads 12 with one allocated for each orifice and capillary channel. The impulse ink jet heads require a slight negative ink pressure to properly enable the ejection of ink drops.

In the view of FIG. 1 three ink jet heads 12 are shown disposed at different vertical heights, though in a particular printing application additional heads 12 may be used either at different heights or at the same height but different lateral (out of the plane of the drawing) positions. Thus, impulse ink jet head 12.1 is shown as the one at the highest location, with heads 12.2 and 12.3 at respective successive lower vertical positions.

In FIG. 1 the capillary supply of ink to ink jet heads 12 is suggested with capillary feed lines 20.1, 20.2 and 20.3, though the actual feed of ink is done as, for example, described in the aforementioned Siemens article. Also, for purposes of schematic presentation, the heads 12 are shown vertically aligned, and as a result, the capillary feed lines 20 have different lengths, though in practice these are built into the heads and the ink is supplied into a small reservoir from which a capillary channel then feeds other capillary channels leading to the orifices.

Ink is supplied from a reservoir 22 through a circulating loop 24. A pump 26 in a supply line 28 provides an ink flow through a filter 30 in a direction indicated by arrow 31 to an upstream side of a supply conduit 32. The ink flows through supply conduit 32 to a discharge port 34 located to return ink to reservoir 22 and thus form a circulating flow of ink. The ink could also be discharged into some other container (not shown) since the actual flow rate can be very small. Ink is supplied by pump 26 to conduit 32 at an input pressure $P_{in}$ as shown where an ink pressure regulator 36 is employed to maintain the input pressure at a preset level relative to ambient pressure. The reservoir 22, pump 26 and filter 30, preferably are at the same horizontal plane with the supply conduit 32.

Supply conduit 32 is coupled to impulse ink jet heads 12 through feed conduits 38 which join the supply conduit 32 at junctions 40. The supply conduit 32 and junctions 40 are vertically below ink jet heads 12 as shown.

Downstream of each junction 40 is a fluid flow impeding device 42 sized to present a resistance to the ink flow. The devices 42 are adjustable as illustrated by the arrows. The fluid flow impedance device may be an adjustable needle valve or such other restriction as will result in a pressure drop, $\Delta P$, across it. The magnitude of the fluid flow impedance is selected so that a column of ink builds up in each feed conduit 38 located on the upstream side of a flow impeder 42.

The magnitudes of the flow impeding devices 42 are selected so that the ink columns in each of the feed conduits 38 is at a height commensurate with the height or vertical disposition of the impulse ink jet head supplied with ink by the column. In the embodiment of FIG. 1, the ink head 12.1 may be, for example, ten inches equivalent to a pressure $P_1$ above junction 40.1 so that the column of ink in feed conduit is made the same, but less a fixed distance that head 12.1 must be above the top 44.1 of the column to establish a negative ink supply pressure of $-P_h$. The capillary channel 20.1 thus is shown extending down into the feed conduit 38.1 to contact and draw up ink from the column. A typical distance between the top 44.1 of the column of ink and ink head 12 is about one inch.

A similar selection of the ink flow impeding devices 42.2 and 42.3 is made so that the columns of ink in the respective feed conduits 38.2, 38.3 attain heights commensurate with the elevation of the ink jet heads 12.2 and 12.3 above junctions 40.2 and 40.3.

Since the size of the pressure drop across each flow impeding device 40 affects the pressure of a downstream located junction, the magnitude selection of the impedances affect each other. The determination of these impedances is simplified by employing pressure regulator 36 which maintains the input pressure, $P_{in}$, at a predetermined level above atmospheric pressure. In the embodiment shown, this pressure $P_{in}$ is the same as $P_1$ or the pressure needed to form a column of ink at the proper height in ink feed conduit 38.1.

Pressure regulator 36 may be a mechanical device or one using electromechanical elements such as a transducer 50 for generating a pressure signal on line 52 representative of the pressure at junction 40.1 with respect to atmospheric pressure. This pressure signal is compared in comparator amplifier 54 with a reference level on a line 56 from a source 58 and representative of a pressure level $P_1$. A difference or error signal is produced by amplifier 54 on line 60 and used to vary the speed of pump 26 in a direction by which the pressure at junction 40.1 is altered to drive the error signal to a minimum level. Other controls for driving pump 26 have been deleted for clarity and it is to be understood that the error signal modifies the pump speed from a normal pumping level commensurate with that needed to provide a flow of ink through circulating loop 24. The normal pump speed is selected such that for midrange settings of flow impedances 42, the ink flow through supply conduit is in the range from about 50 to about 100 times the ink consumption rate by all of the ink jet heads 12.

With the pressure junction 40.1 maintained at a constant level, the magnitudes of impedances can be determined as follows. The actual pressures at junctions 40.2 and 40.3 needed are as determined by the column heights, i.e. $P_2$ inches of water (or ink if the same density as water) in feed conduit 38.2, and $P_3$ inches in feed conduit 38.3, while the pressure at discharge port 34, i.e. the pressure on the downstream side of flow impeding device 42.3 is, for practical purposes, at atmospheric pressure. From these values the magnitude of the pressure drops $\Delta P_a$, $\Delta P_b$ and $\Delta P_c$ can be obtained and the corresponding flow impedances calculated using equivalent relationships as used in determining impedances in an electrical circuit having a constant voltage source (pressure $P_{in}$).

With the apparatus as thus described, a precise and yet convenient control over the delivery of ink to impulse ink jet heads 12 can be obtained even though these are at different heights.

Having thus explained an apparatus in accordance with the invention for feeding ink to impulse ink jet heads at different vertical locations, variations from the described embodiments can be made. For example, the flow impeding devices 42 may be formed as shown in FIG. 2 with fixed impedance devices such as smaller cross-sectional area tubings 62 between junctions 40. A tubing 62 has an internal bore, diameter d, and a length L selected to provide the flow resistance needed to establish the desired pressure drops. Variations from the described embodiments can be made without departing from the scope of the invention.

What is claimed is:

1. An apparatus for delivering ink from a supply to inputs of a plurality of ink jet heads of the type which deliver ink through capillary action to orifices from which ink drops are ejected and wherein ink jet heads are disposed to print from different vertical positions, comprising:

conduit means extending from an intake at said supply to an ink discharge port;

means for producing in said conduit means and from said supply of ink a flow of ink starting at an upstream location to flow downstream to said ink discharge port;

means for coupling ink jet heads disposed at different vertical positions to said conduit means at junctions whose successive positions along the stream of ink correspond with successive vertically lower positions of the ink jet heads;

means interposed in said conduit means and at least between said junctions for generating a fluid flow impedance therein of a magnitude selected to enable formation of a column of ink in the coupling means on the upstream located junction with the column height commensurate with the vertical height of the ink jet head supplied with ink from the column.

2. An apparatus as set forth in claim 1 wherein said means for generating a fluid flow impedance provides fluid flow impedances on the downstream side of said junctions.

3. An apparatus as set forth in claim 2 wherein said means for generating fluid impedances further comprises variable restrictors.

4. An apparatus as set forth in claim 1, 2 or 3 and further including:

means for regulating the ink pressure in the conduit means upstream of the junctions to a predetermined level above atmospheric pressure.

5. An apparatus for delivering ink from a supply to inputs of a plurality of impulse ink jet heads of the type which deliver ink through capillary action to orifices from which ink drops are ejected and wherein selected impulse ink jet heads have different vertical positions comprising:

means for producing a circulating flow of ink commencing at a predetermined pressure above atmospheric pressure;

means for coupling the inputs of ink jet heads to said circulating ink flow producing means, with impulse ink jet heads at different vertical positions being coupled to the circulating flow at different junctions therealong; and means interposed in said circulating flow of ink on at least downstream sides of selected junctions for generating fluid flow impedances of a magnitude selected to form columns of ink in said coupling means of sufficient height to deliver ink to the impulse ink jet heads.

6. An apparatus as set forth in claim 5 wherein said means for generating fluid flow impedances comprises tubes having internal bores, said tubes having lengths and internal bore cross-sectional areas selected to provide said fluid flow impedances.

7. An apparatus as set forth in claim 5 wherein said circulating flow producing means discharges said ink at atmospheric pressure.

* * * * *